United States Patent [19]

Bowen

[11] 4,165,463

[45] Aug. 21, 1979

[54] RADIATION MONITORS AND METHOD FOR POSITIONING

[75] Inventor: William E. Bowen, Trenton, N.J.

[73] Assignee: American Can Company, Greenwich, Conn.

[21] Appl. No.: 837,020

[22] Filed: Sep. 27, 1977

[51] Int. Cl.² ............ G01J 1/42; G01N 21/00
[52] U.S. Cl. .................... 250/372; 250/491
[58] Field of Search ........... 250/372, 359, 461, 491; 356/51; 250/227

[56] References Cited

U.S. PATENT DOCUMENTS

| 3,437,807 | 4/1969 | Moore | 250/372 |
| 3,755,674 | 8/1973 | Murray et al. | 250/372 |
| 3,980,893 | 9/1976 | Merlen | 250/227 |

Primary Examiner—Alfred E. Smith
Assistant Examiner—Janice A. Howell
Attorney, Agent, or Firm—Robert P. Auber; George P. Ziehmer; Ira S. Dorman

[57] ABSTRACT

In a manufacturing operation utilizing radiation and particularly ultraviolet radiation irradiating a surface, a plurality of radiation carrying pipes positioned at one end thereof adjacent the surface and within the radiation, and radiation sensors positioned at the other end of the light pipes within a cooling stream. The invention also includes a fixture and a method for adjusting the position of the radiation carrying pipes.

5 Claims, 8 Drawing Figures

RADIATION MONITORS AND METHOD FOR POSITIONING

BACKGROUND OF THE INVENTION

To dry the printing or to polymerize the ink or coating on a metal sheet, particularly a tin plate sheet, preparatory to making it into cans, ultraviolet lamps may be used. It is desirable continuously to monitor the ultraviolet lamps to determine if they are bright enough to perform properly. To that end, one may place ultraviolet radiation sensors adjacent the ultraviolet lamp tubes to detect the presence or absence and intensity of radiation.

With the radiation sensors adjacent the ultraviolet lamps, the sensors tend to become overheated and to fail.

Sensors may also be placed adjacent the irradiated tin plate surface, usually a plane, where the ink or coating is becoming polymerized. Here too the sensors tend to become too hot and to fail.

Further, when the reflectors of the ultraviolet radiation and elliptical reflectors or substantially elliptical reflectors, with ultraviolet lamps substantially at one focus of the ellipse and the irradiated tin plate at the other focus of the ellipse, the ink to be polymerized then receives high intensity radiation in substantially lines parallel to the ultraviolet radiation producing tubes and transverse to the direction of motion of the tin plate supporting the inked message.

It is desirable to position ultraviolet detectors substantially in the focal plane of the elliptical reflectors and in the lines of highest intensity of received radiation.

Ultraviolet radiation is customarily accompanied by heat, and temperatures in the ultraviolet apparatus could reach 250° F. or greater. With the focusing of radiation in a surface at the sensors the sensors are even more rapidly destroyed.

BRIEF DESCRIPTION OF THE INVENTION

Frequently during the manufacture of food cans, and the like, it is desired to print a label on the outside of the cans. One technique for printing a label is to print a polymerizable ink or coating onto a sheet of metal or tin plate which is to be made into cans. The ink or coating is then polymerized on the sheet by exposing it to ultraviolet light.

Typically, a sheet of tin plate metal is guided onto a surface upon which ultraviolet light has been focused. Alternatively, the ultraviolet light may be diffused or spread over the surface of the sheet.

It is desirable to know when the ultraviolet intensity falls below an effective level.

To prevent the ultraviolet sensors from becoming too hot, the sensors of this invention are placed within a duct which carries heat away by convection. Light pipes such as quartz pipes extend from the ultraviolet radiation sensors to desired ultraviolet sensing positions adjacent the tin plate.

Typically, the ultraviolet radiation sources are line sources such as fluorescent tubes. Also typically the tubes are placed at one focus of elliptical reflectors with the other focus substantially at the surface or plane of the tin plate where the ink or coating to be polymerized will pass.

Each ultraviolet light has associated therewith a separate quartz radiation carrying pipe and receiving an ultraviolet radiation detector. It is desired to align the radiation receiving end of the quartz pipe with the corresponding ultraviolet radiation source. To that end a fixture having a substantially horizontal post, pin, or rod is mechanically aligned with the receiving or input end of the quartz light pipe, is positioned over the light pipe, and is designed to cast a narrow shadow in the radiation pattern transverse to the direction of the motion of the tin line tin plate. A separate moveable ultraviolet sensing probe is positioned to move in the direction of motion of the tin plate and adjacent the light pipes and below the shadow producing rods. As the sensing probe is moved in the direction of tin plate motion, it senses the intensity of ultraviolet radiation. That intensity typically reaches peaks when the probe is directly below the radiation producing tubes. As the sensing probe moves under the horizontal rods, sharp decreases in received radiation occur, and a plot of radiation intensity vs. probe position shows the distance that the horizontal rod and its corresponding light pipe are away from the position of highest intensity of the focused radiation. The rod fixture and the light pipe may then be repositioned and the test repeated. The sensing probe may also be used to sense whether the radiator reflectors are properly positioned and shaped by comparing the plot of radiation intensity versus position with those having proper adjustment.

It is therefore an object of this invention to sense the intensity of ultraviolet radiation.

There is another object of this invention to cool ultraviolet sensors.

It is a further object of this invention to transmit ultraviolet radiation from sensing positions to radiation sensors.

It is still a further option of this invention to align ultraviolet receptors with ultraviolet radiators.

BRIEF DESCRIPTION OF THE DRAWINGS

Other objects will become apparent from the following description, taken in connection with the accompanying drawings, in which.

DETAILED DESCRIPTION OF THE INVENTION

Figure 1:
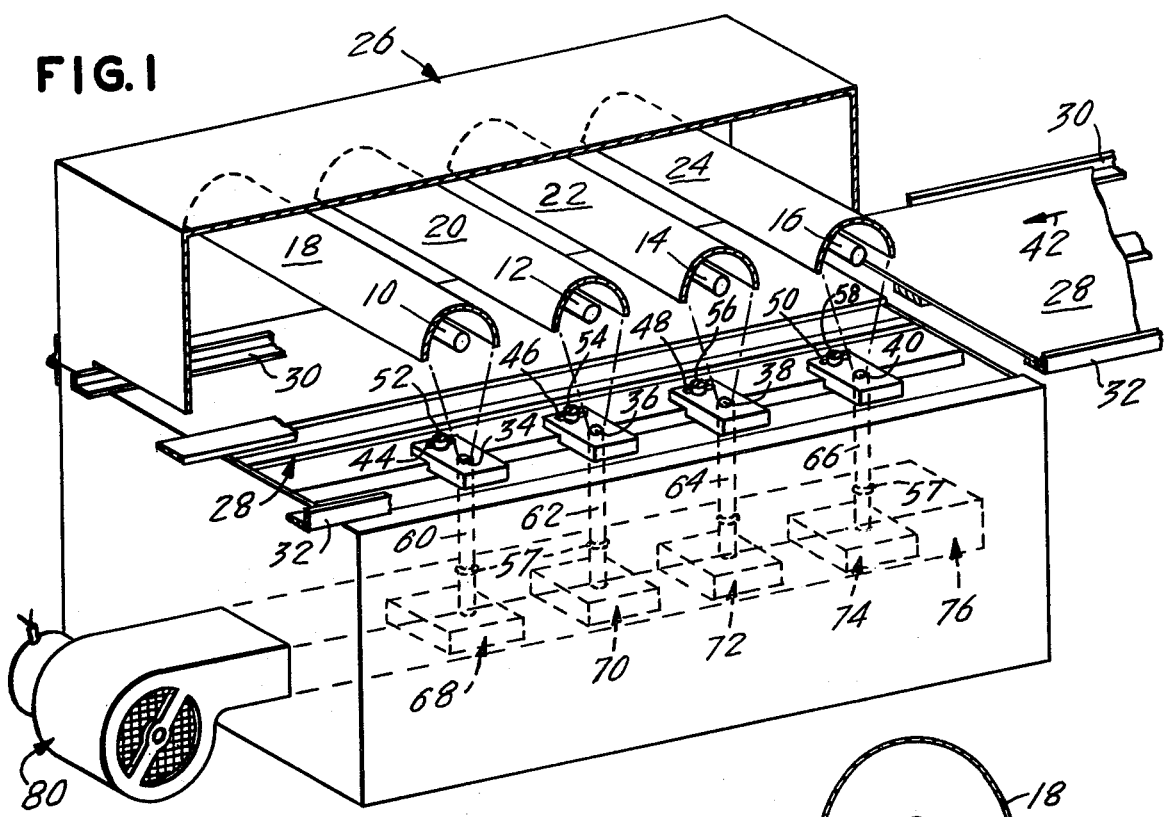
FIG. 1 is an oblique view, partly in section, of an apparatus of this invention utilizing four ultraviolet receptors and sensors.

Referring to FIG. 1, a plurality of ultraviolet lamp tubes 10, 12, 14, and 16, have reflectors 18, 20, 22, and 24, respectively.

The ultraviolet light radiates and preferably is focused onto the tinplate line and polymerizes inks or coatings which are printed on tinplate sheet 28.

Preferably the reflectors 18, 20, 22, and 24 are elliptical in section with the line or tube radiation sources 10, 12, 14, and 16 substantially at one focus of the ellipse. The radiation is then focused substantially at the other focus of the ellipse which is approximately on the plane of the upper surface of the tin plate line. The sources 10, 12, 14, 16, and the reflectors extend substantially horizontally across the tinplate line and transverse to the direction 42 of tinplate motion.

Adjacent the tinplate line and immediately below it, but also substantially at the second focus of each of the ellipses formed by the reflectors 18, 20, 22, and 24 are a plurality of light receiving orifices or receptors 34, 36, 38, and 40. The position of the receptors 34, 36, 38, and 40 in the direction shown by the arrow 42 (hereinafter called the longitudinal direction) are adjustable within small limits defined by the slots 44, 46, 48, 50 and the set screws 52, 54, 56, and 58.

The receptor orifices 34, 36, 38, and 40 are each connected by light pipes 60, 62, 64, 66 which are preferably made of quartz to conduct the ultraviolet radiation from the orifices 34, 36, 38, and 40 into the sensor boxes or heads 68, 70, 72, and 74 which are particularly adapted to sense the presence or absence as well as the intensity of ultraviolet radiation.

Typically the ultraviolet sensors within the heads 68, 70, 72, and 74 are heat sensitive, and to prevent their overheating they are placed in a duct 76 through which cooling air is pumped by the pump 80. Additional vanes may be attached to the outsides of the sensors heads 68, 70, 72, 74 if desired to make the sensors operate at an even cooler temperature.

Figure 2:
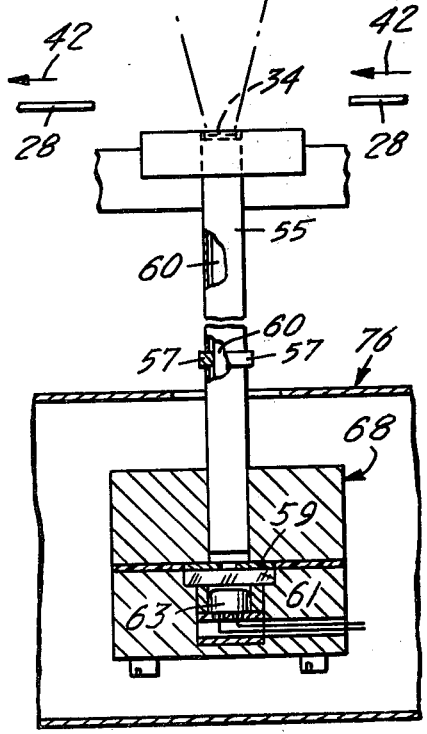
FIG. 2 is a view, partly in section, of one ultraviolet radiator, receptor and sensor with the sensor positioned in a cooling zone.

As shown in FIG. 2, the light tube 60 is surrounded by a protective sheath 55 which has a heat break, for example of ceramic material, as shown at 57. The ultraviolet from the quartz tube 60 is delivered to an aperture 59 having a central hole therein and then to an ultraviolet filter 61 and an ultraviolet radiation sensor 63 which generates a voltage in response to the receipt of ultraviolet light.

Figure 6:
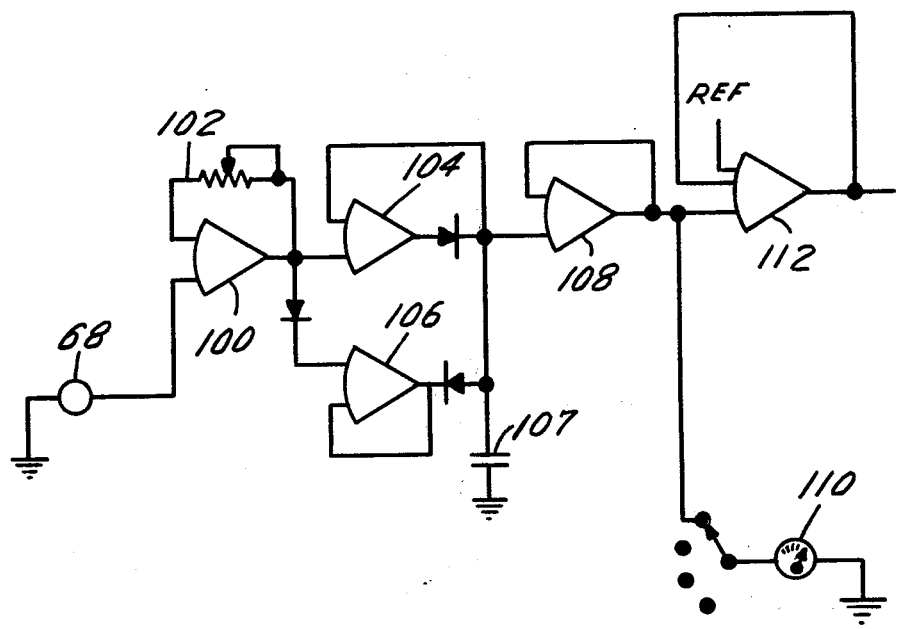
FIG. 6 is a block diagram of a typical analog electronic apparatus for delivering a usable signal from the radiation sensor.

The outputs of the sensors of heads 68, 70, 72, and 74 are carried by wires (not shown) to separate channels of electronics such as the circuit in FIG. 6. Circuits such as the electronics of FIG. 6 are provided for each of the ultraviolet sensors in boxes 68, 70, 72 and 74. One sensor 68 is shown in FIG. 6, and the remaining channels are substantially identical to that of FIG. 6.

The output of the sensor 68 is connected through an operational amplifier to avoid loading the sensor and to normalize the signal to full scale when peak illumination from a new lamp tube is received. This operational amplifier is shown at 100 with an adjustable feedback loop 102 to adjust the meter 110 to full scale with a new lamp.

The amplifiers 104, 106, including their feedback loops and condenser 107 form sample and hold circuits. Signals are received by the receiving receptor orifices 34, 36, 38, 40 only in the small period between consecutive sheets 28. The time constants of the circuit associated with amplifiers 104, 106 are such that the intermittent signal is held by the condenser 107. Amplifier 104 is a storage amplifier operating at unit gain. Amplifier 106 is a reset amplifier which provides a discharge path for condenser 107 when the input signal reduces for a substantial time period. The amplifier 108 is a buffer amplifier to drive the meter 110 while avoiding discharge of condenser 107. Amplifier 112 is a comparator used to drive the logic circuit of FIG. 8 when the signal out of 108 falls below the reference level.

Figure 8:
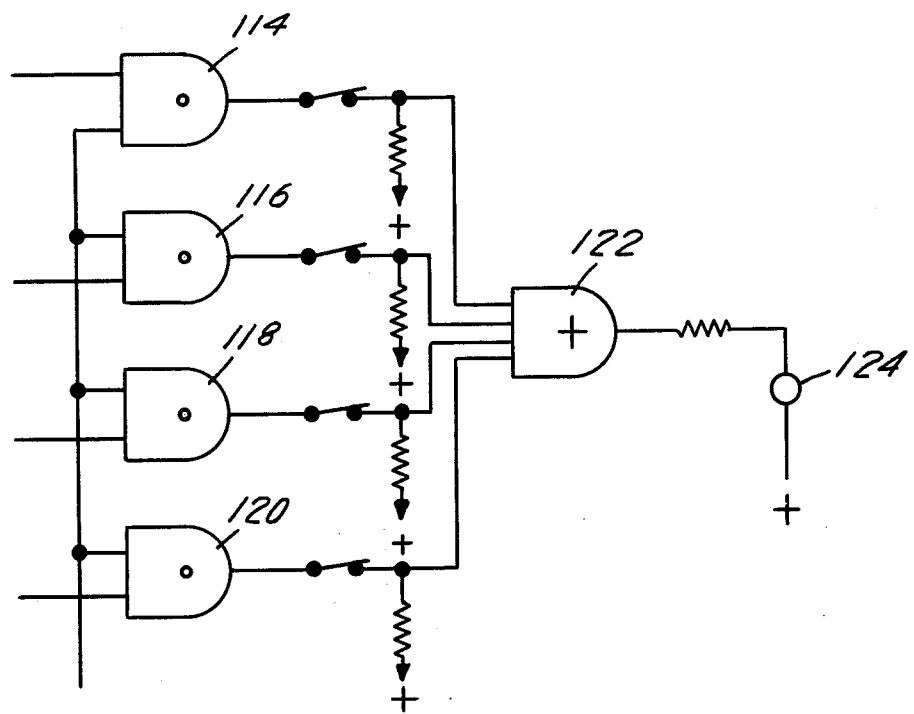
FIG. 8 is a logic circuit for controlling an alarm in response to the outputs of the circuits of FIG. 6.

In FIG. 8, four channels are shown. Should the output of any one of the four channels fall below a predetermined amplitude the output of the respective AND gate 114, 116, 118 or 120 would trigger OR gate 122 and produce an alarm signal at the alarm 124. Additional gates would be needed for additional channels, and the switches are for disconnecting respective channels when they are not in use.

Figure 3:
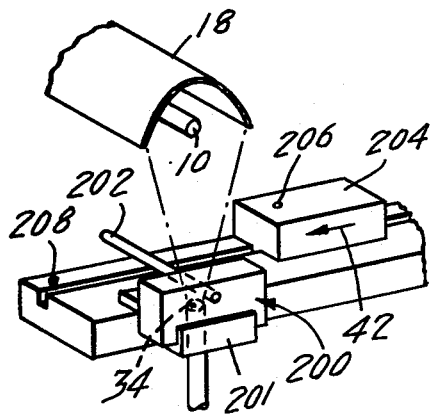
FIG. 3 is an oblique view of apparatus positioned to align ultraviolet radiation receptors with ultraviolet radiation sources.
Figure 4:
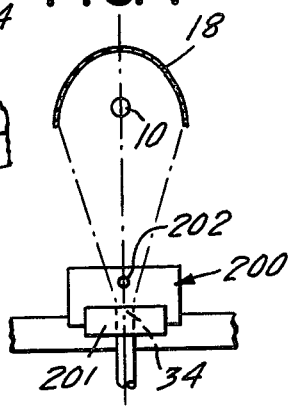
FIG. 4 is an end view of a single radiation source and receptor together with an alignment fixture and rod for aligning the source and receptor in accordance with this invention.
Figure 5:
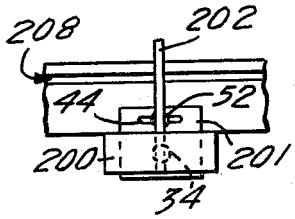
FIG. 5 is the view taken from the top in FIG. 4.

FIGS. 3, 4, and 5 show a fixture 200 sitting above the receptor orifice 34, with a dowel or pin 202 extending horizontally and transversely to the tinplate flow direction 42, aligned parallel to the axis of the tube 10 and mechanically positioned precisely to sit on top of the member 201 which, in turn supports the receptor orifice 34.

Figure 7:
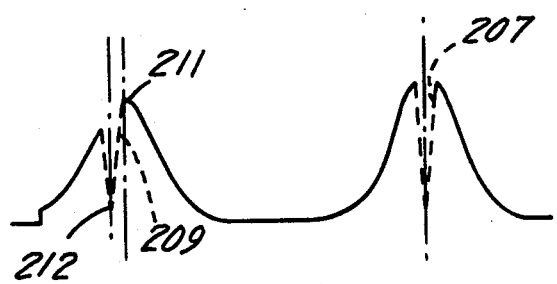
FIG. 7 is a typical trace of radiation intensity versus position obtained during the alignment procedure of this invention.

A moveable radiation sensor box 204 with an orifice 206 for receiving ultraviolet radiation is positioned substantially at the tin line height to be moved in and along the slot 208. As the aperture 206 is moved in the direction of the arrow 42, a plot of the ultraviolet intensity determined by the sensor 206 within the box 204 versus the position of sensor 206 is made. The sensor 206 has a height which is less than the rod 202, whereby the sensor 206 passes under the rod 202. When the rod 202, and hence the receptor orifice 34, are at the point of highest intensity of received radiation, usually directly beneath the ultraviolet radiation tube 10, a shadow is cast on the orifice 206 as the orifice 206 passes under the rod 202, and that is recorded as an intensity decrease shown at 207 in FIG. 7. When the rod 202 and the receptor orifice 34 are to one side of the point of highest received radiation, a plot such as that shown at 209 in FIG. 7 occurs. The distance between the top intensity peak 211, and the bottom peak of the shadow 212 is determined, and the orifice 34 is moved by that corresponding amount until the plot 207 occurs.

The movable sensor box 204 may be moved without opening the box 26 by attaching a long handle (not shown) to one end. The handle may be telescoping, if desired. Further, the position of the orifice may be accurately measured by having a scale (not shown) on the handle.

In a cruder fashion, the position of the sensor 206 may merely be measured from a benchmark.

More sophisticated measuring devices such as evenly spaced marks along the bed, detectors for those marks, and a counter could be used to determine the position of the receptor orifice 206. The handle may also be used as a wiring harness (not shown).

Thus the apparatus of this invention monitors the intensity of ultraviolet radiation delivered to the polymerizable ink or coating so that lamps may be replaced when the radiation is reduced to less than an effective intensity. Further, a technique has been disclosed for aligning the ultraviolet receptor orifices with points of highest intensity of received radiation.

Although the invention has been described in detail above, it is not intended that the invention shall be limited by that description, but rather by the description taken together with the accompanying claims.

I claim:

1. Apparatus for monitoring radiation intensity from an ultra violet radiation source in a chamber designed for curing discrete coated sheets, comprising:
   (a) a box;
   (b) an ultra violet intensity sensing means mounted on said box and in alignment with said ultra violet source;
   (c) a conveying surface mounted on said box between said ultra violet source and said ultra violet sensor and wherein said surface is substantially normal to an axis aligning said ultra violet source with said ultra violet sensing means;
   (d) an ultra violet receptor mounted beneath but proximate to said conveying surface; and in alignment with said ultra violet sensing means and said ultra violet source;
   (e) an ultra violet transmitting means with a first end and a second end wherein said first end is received within said ultra violet receptor and said second end is in communication with said ultra violet sensing means; and
   (f) means for cooling said ultra violet sensing means.

2. Apparatus for monitoring radiation from a plurality of focused ultra violet radiation sources in a chamber designed for curing discrete coated sheets, comprising:
   (a) a box;
   (b) a plurality of ultra violet intensity sensing means mounted on said box and wherein each of said ultra violet sensing means is aligned with a separate one of said radiation sources;
   (c) a conveying surface mounted on said box in a plane falling between said radiation sources and said sensing means, and wherein said conveying surface passes substantially through the focal points of said radiation sources whereby said coated sheets are conveyed past said radiation sources to receive a dose of focused radiation from each source;
   (d) a plurality of ultra violet receptors mounted beneath said conveying surface and closely proximate thereto and wherein each of said receptors is aligned with a separate one of said radiation sources and a separate one of said radiation sensing means;
   (e) a plurality of radiation transmitting means wherein each of said transmitting means has a first end and a second end and wherein said first end of each of said transmitting means is received within a separate one of said receptors and the second end of each of said transmitting means is in communication with a separate one of said sensing means, whereby radiant energy impinging on each of said receptors is transmitted to a separate one of said sensing means; and
   (f) means for cooling said sensing means.

3. The apparatus of claim 2 wherein each of said radiation transmitting means further comprise a quartz light pipe with a thin protective sheath thereon and wherein each of said sheathed light pipes terminates in a separate sensor box of substantial mass in which one of said radiation sensing means is received and wherein said sensor box is positioned within an air duct.

4. The apparatus of claim 3 which further comprises a plurality of electronic channnels wherein said channel is connected to a separate one of said sensing means and includes:
   (a) a normalizing amplifier for adjusting the output signal from said sensing means;
   (b) means for storing the output signal received from said normalizing amplifier;
   (c) a buffer amplifier in series with said storage means;
   (d) a meter driven by said buffer amplifier; and
   (e) a gate threshold amplifier connected to said buffer amplifier for comparison of said output signal level with a standard.

5. A method for aligning radiation receiving means with a high intensity focused radiation source in a chamber for curing conveyed coated sheet comprising the steps of:
   (a) aligning an indicating rod with said receiving means in a plane parallel to the path of conveyed sheet and in transverse disposition thereto wherein said rod intercepts at least a portion of the direct radiation impinging on said receiving means;
   (b) advancing a sensing probe along the plane of sheet conveyance wherein said sensing probe is provided with a light directing aperture which aperture substantially excludes indirect radiation from striking said sensor and wherein said sensing means is caused to pass between said indicating rod and said radiation receiving means;
   (c) measuring the radiation intensity received by said sensing probe as it is longitudinally advanced along the plane of conveyance;
   (d) plotting the radiation intensity against the probe position along the longitudinal path; and
   (e) adjusting the longitudinal position of said receptor and repeating the radiation sensing until the plot of radiation intensity against probe position results in two radiation peaks of equal amplitude.

* * * * *